Feb. 26, 1957 J. O. GARRISON ET AL 2,783,050
LOCATING STUD
Filed March 2, 1953
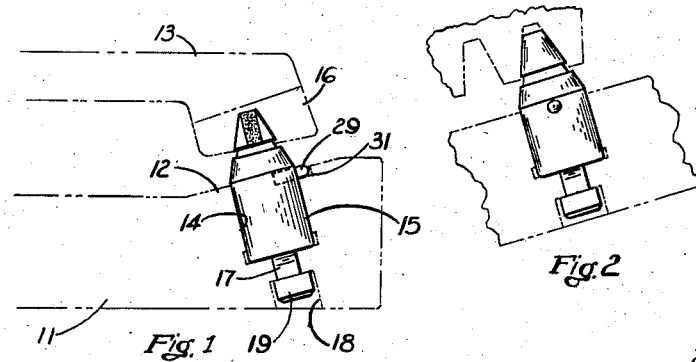
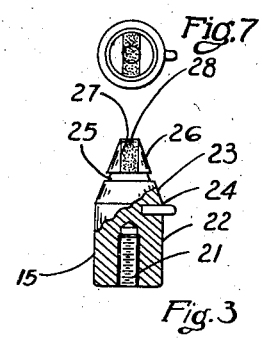
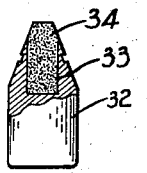
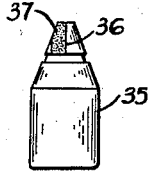
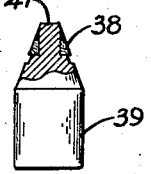
INVENTOR.
JAMES O. GARRISON
and DAVID D. WALKER
BY
Tom Walker

United States Patent Office

2,783,050
Patented Feb. 26, 1957

2,783,050
LOCATING STUD

James O. Garrison and David D. Walker, Dayton, Ohio, assignors to Garrison Machine Works, Inc., Dayton, Ohio, a corporation of Ohio Application March 2, 1953, Serial No. 339,844

9 Claims. (Cl. 279—1)

This invention relates to chucks, used to center and hold work pieces while performing various machining operations thereon. More particularly the invention is concerned with locating studs, installed in and forming a part of the chuck body, directly effective on a gear by engaging adjacent faces of contiguous gear teeth.

The heads of the locating studs, which project from the chuck for contact with the gear, are subject to wear. The shanks of the studs, which are recessed in the chuck, are subject to shearing stresses and are required to be accurately and securely seated in the chuck. The locating studs are accordingly made independently removable so that a worn, imperfect or damaged stud may be replaced without necessity of substituting a completely new gear chuck.

The object of the invention is to improve the construction as well as the means and mode of operation of locating studs whereby they may not only be economically manufactured, but will be more efficient and satisfactory in use, substantially uniform in operation throughout their useful life, and be unlikely to get out of repair.

A further object of the invention is to prolong the useful life of such locating studs thereby reducing replacement time and cost, incident to use of gear chucks of the kind described.

Another object of the invention is to reduce the effects of wear on the head of the locating stud.

A further object of the invention is to make the locating stud stronger and to provide it with a broader bearing in the chuck by increasing the diameter of the shank.

Still another object of the invention is to provide improved means for drawing the stud to a secure seat in the chuck.

A further object of the invention is to utilize a special wear resistant material in the head of the locating stud.

A further object of the invention is to utilize the wear resistant material referred to in the form of inserts, which may take various forms, all designed to make the most economical yet effective use of the material.

A further object of the invention is to provide locating studs having the advantageous structural features, the inherent meritorious characteristics and mode of operation herein mentioned.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings, or their equivalents.

Referring to the accompanying drawing, wherein is shown the preferred but obviously not necessarily the only form of embodiment of the invention, Fig. 1 is a view in side elevation of a locating stud in accordance with a first illustrated form of the invention, indicated as mounted in a chuck and engaging a gear;

Fig. 2 is a view similar to Fig. 1, with the locating stud turned 90°;

Fig. 3 is a view of the stud of Figs. 1 and 2, shown partly in longitudinal section;

Fig. 4 is a view similar to Fig. 3, showing another form of locating stud in accordance with the invention;

Fig. 5 is a view similar to Fig. 4, showing a further form of locating stud;

Fig. 6 is a view similar to Fig. 5, showing still another form of locating stud, and Figs. 7, 8, 9 and 10 are top plan views of the studs of Figs. 3, 4, 5, and 6 respectively.

Like parts are indicated by similar characters of reference throughout the several views.

Referring to the drawings, a gear chuck of the instant kind includes a body 11, having a portion 12 in approximately parallel relation to the face of a gear 13. A plurality of recesses 14 (one shown) in the surfaces 12 mount locating studs 15 which project into spaces between teeth 16 of the gear 13, holding the gear against rotary motion relatively to the chuck.

The recess 14 has an axial opening 17 in the bottom thereof communicating with a recess or counterbore 18 in opposing relation to the recess 14. A screw stud 19 is inserted through the opening 17, by way of the counterbore 18, into the recess 14 where it is received in an axial, tapped opening 21 in the stud 15. The head of the stud 19 lies in the counterbore 18 and limits against the bottom thereof. So arranged, it will be apparent that a turning motion of the screw stud 19 in a direction to drive it into the tapped opening 21 will serve to draw the stud 15 inward or downward to a firm seat on the bottom of recess 14.

Referring more particularly to the locating stud 15 it comprises a relatively broad cylindrical shank portion 22 and an integrally formed conical head portion 23. The shank portion 22 is received in the recess 14 with a close fit and contains the above mentioned tapped opening 21.

The conical head portion 23 projects above the surface 12 of the chuck and may be considered as having a base 24, a circumferential groove 25 and an apex 26, the latter terminating in a blunt end to present a frustoconical shape.

The base 24 merges with the shank 22 at one end and at its other end terminates in the groove 25. The latter is useful in obtaining a grip on the stud for its removal from the chuck body, and also provides clearance for the edges of the gear teeth 16.

The apex portion 26, as indicated in Figs. 1 and 2, is adapted to be received between contiguous teeth 16 with diametrically opposed portions of the side wall thereof in contact with adjacent faces of the teeth. Such apex portion is intersected by a transverse slot 27 opening through the described diametrical points of the side wall and through the top or frustum of the stud.

Installed in the slot 27 is an insert 28 made of a relatively harder material than the shank 22 and head 23 are made, for example a carbide material. The edges of the insert 28 are exposed to the surface of the apex portion 26 and to contact with the gear teeth 16, with the result, as will be understood, of imparting greater wear resistance to the stud than has heretofore been known.

In the installation of the insert 28, a piece of the carbide or like material is cut approximately to size and fitted into the slot 27, following which the parts are brazed to unite the insert and apex 26 in a substantially integral structure. Finally, the edges of the insert may be machined, as required, in order that the insert may conform to and complete the conical shape of the head 23.

In the embodiment of Figs. 1, 2 and 3, it is desirable that the locating stud occupy a selected position of rotary adjustment in the recess 14 in order that the insert 28 may be properly aligned for contact with the faces of the teeth 16. Accordingly, at the upper end of the shank 22 there is mounted a laterally projecting pin 29 to be received in a cut out or recess 31 in the chuck surface 12. In mounting a locating stud in a chuck recess 14, the pin 29 is aligned with the cut out 31, and, as the stud is drawn to a seated position in the manner before described, is moved into engagement therewith. The pin and cut out connection is located to position the insert material 28 for contact with the teeth 16 and further is effective to hold the locating stud against rotary motion out of such position.

In the form of the invention shown in Figs. 4 and 8 a stud 32 is constructed like the stud 15 except that the apex portion thereof is shorter in length, and further in that an axial bore 33 replaces the transverse slot 27 of the previously considered embodiment. A cylindrical length 34 of carbide material is installed in the bore 33, the projecting end thereof being machined to serve as a continuation of the apex portion of the stud, conforming to and completing the frusto-conical shape thereof. In this embodiment of the invention the locating stud may assume any rotative position in the chuck recess since the outer work engaging end of the stud presents a carbide surface over its full circumference.

In the embodiment of Figs. 5 and 9, a stud 35 is like the stud 15 except that the transverse slot 36 therein, which receives a carbide insert 37 is offset relatively to the longitudinal axis of the stud. Such a construction might be used, for example, to insure contact of the hard material with gear teeth which are not parallel in their longitudinal planes.

In the case of the embodiment shown in Figs. 6 and 10 a ring 38 of carbide material is used to achieve a result similar to that described in connection with Figs. 4 and 8. According to this form of the invention a locating stud 39 is formed with a cylindrical projection 41 which replaces the apex portions of the previously considered embodiments. The ring 38 has a cylindrical inner bore receiving the projection 41 and a frusto-conical exterior conforming to and completing the conical shape of the head of the locating stud. The ring 39 is brazed to or otherwise made a part of the stud, as in the case of the other forms of the invention.

While the drawing shows the use of a standard screw 19 to hold the stud in place, tapered screws or special types of fasteners may be used whereby the stud is expanded within the recess 14 to locate and lock it in position relative thereto.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise but one of several modes of putting the invention into effect.

Having thus described our invention, we claim:

1. A locating stud for a gear chuck adapted to engage adjacent faces of contiguous gear teeth, including a conical head having a circumferential groove between its base and apex portions, a shank formed integrally with said head, said head being incompletely formed, and means made of a material different from the material of said head and shank completing the conical formation of said head and exposed to the surface of said head from said groove to and through the apex portion for contact with the faces of the gear teeth.

2. A locating stud for a gear chuck adapted to engage adjacent faces of contiguous gear teeth, including an incomplete conical head portion having a circumferential groove between its base and apex portions, a shank formed integrally with said head, and means made of a material different from the material of said head and shank supported by said stud in complementary relation to said head to define a conical formation for contact with said gear teeth, said means extending lengthwise in said head from said groove to the apex portion of said head.

3. A locating stud according to claim 2, characterized in that said means is exposed externally of said head for contact with the faces of said teeth.

4. A locating stud for a gear chuck adapted to engage adjacent faces of contiguous gear teeth, including a cylindrical body serving as a shank, a smaller diameter conical head projecting from one end of said body having a circumferential groove between its base and apex portions, and a relatively hard wear resistant material attached to and made a part of said head between said groove and the apex portion of the head, said material and said head cooperating to define a conical formation for contact with said gear teeth.

5. A locating stud for a gear chuck, including a cylindrical body serving as a shank, a frusto-conical head projecting from one end of said shank, an axial bore in said stud opening through the apex end of said head, and an insert made of a relatively hard material installed in said bore with its exposed portions conforming to and completing the frusto-conical shape of said head.

6. A locating stud for a gear chuck, including a cylindrical body serving as a shank, a frusto-conical head projecting from one end of said shank, an axial bore in said stud opening through the apex end of said head, and a cylindrical insert made of a relatively hard material installed in said bore and extending through and beyond the apex end of said head, the projecting end of said insert conforming to and serving as an extension of said head.

7. A locating stud for a gear chuck, including a cylindrical body serving as a shank, a smaller diameter head projecting from one end of said shank, and a ring of a relatively hard material installed on said head, said ring and head being complementarily formed of a conical shape.

8. A locating stud according to claim 7, characterized in that said head is cylindrical in shape and said ring is frusto-conical in shape and centrally bored to receive said head.

9. A locating stud for a gear chuck, including a cylindrical body serving as a shank, a frusto-conical head projecting from said shank, said head having a transverse slot opening through the top and sides of said head, and an insert made of a relatively hard material installed in said slot with its edges conforming to and completing the frusto-conical shape of said head, characterized in that said slot is misaligned with respect to the longitudinal axis of said stud.

References Cited in the file of this patent

UNITED STATES PATENTS

| | | |
|---|---|---|
| 1,677,055 | Simons | July 10, 1928 |
| 1,804,756 | Elwood | May 12, 1931 |
| 1,826,542 | Hervig et al. | Oct. 6, 1931 |
| 1,847,302 | Emmons | Mar. 1, 1932 |
| 1,951,856 | Balke | Mar. 20, 1934 |
| 2,296,955 | Sherwell et al. | Sept. 29, 1942 |
| 2,377,468 | Venditty | June 5, 1945 |
| 2,424,776 | Stapleton | July 29, 1947 |
| 2,522,217 | Fischer et al. | Sept. 12, 1950 |
| 2,535,199 | Day | Dec. 26, 1950 |